May 19, 1953
G. R. LARKIN
2,638,788
INSTRUMENT VIBRATING DEVICE
Filed March 14, 1950
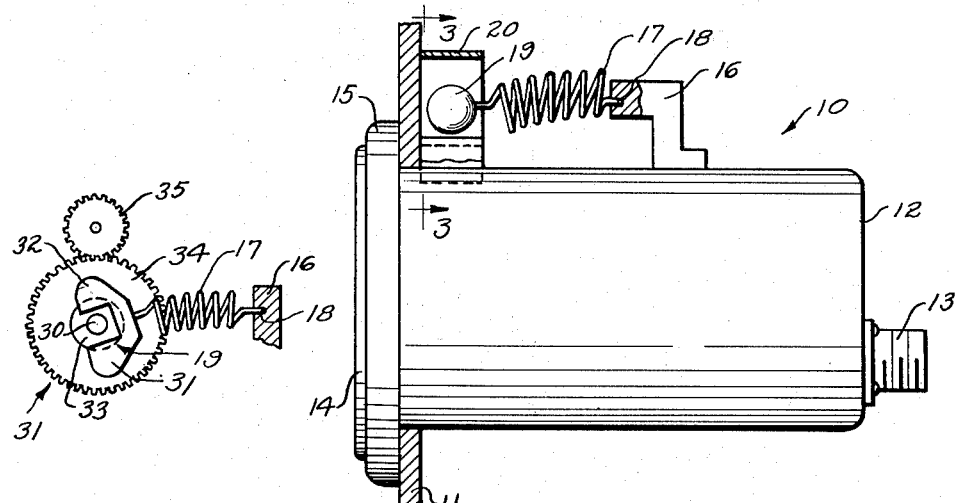
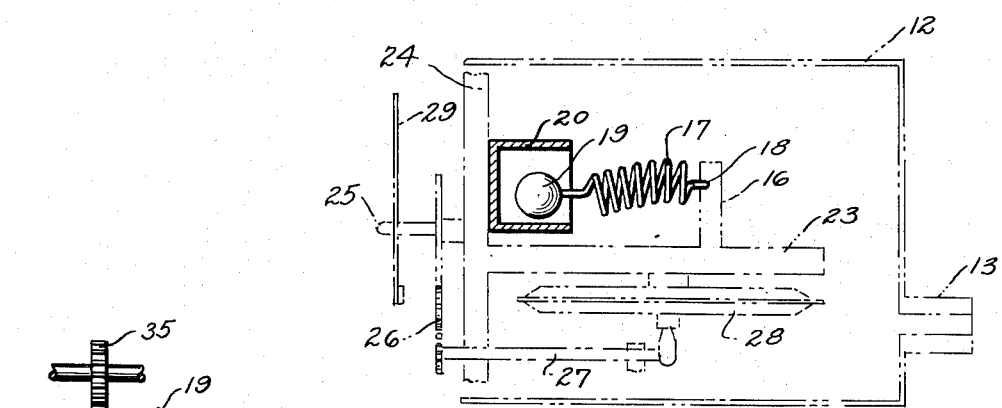
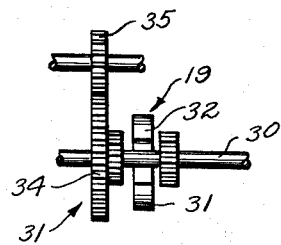
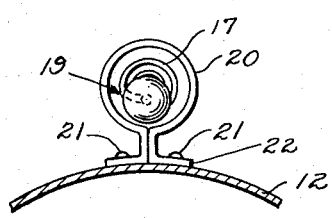
INVENTOR.
GEORGE R. LARKIN
BY *Wade Koontz* AND
*Chester Tietig*
ATTORNEYS Patented May 19, 1953

2,638,788

UNITED STATES PATENT OFFICE 2,638,788

INSTRUMENT VIBRATING DEVICE

George R. Larkin, Dayton, Ohio

Application March 14, 1950, Serial No. 149,622

9 Claims. (Cl. 73—432)

(Granted under Title 35, U. S. Code (1952), sec. 266)

The invention described herein may be manufactured and used by or for the Government for governmental purposes without payment to me of any royalty thereon.

Lag in an instrument is a very objectionable feature when smooth accurate indications are required. This invention relates to a device for eliminating the lag of instruments of many kinds, but particularly of airplane instruments.

Heretofore it has been the custom of engineers when conducting tests in which little vibration of machinery occurs, to tap the control instruments from time to time with a light object, such as a pencil to prevent them from sticking. Whole instrument boards have been purposely subjected to vibration by means of an electromechanical buzzer, to make sure that none of the instruments on the board were lagging. This method of approach to the lag problem is objectionable for the reason that certain instruments on the board may require no vibration; in fact vibration may be disadvantageous to their operation.

Particularly in airplanes, since the advent of jet propulsion, the lag problem has become acute. In airplanes employing reciprocating engines, there is usually no lack of vibration; however, jet engines operate so smoothly that the device such as the present invention is highly desirable to prevent lag due to so called static friction.

One object of the invention is to provide individual means on each instrument requiring same, for the purpose of supplying high fequency, low energy vibration to neutralize the effects of static friction.

Another object of the invention is to provide a simple low cost device of the above character which may be applied to existing individual instruments and which requires no separate source of power for its operation.

Another object is to provide a device of the above character which will increase the frequency of the normal shocks to which an instrument is subjected during flight and to apply the higher frequency vibration at a point or points at which such vibration will have the maximum efficiency to neutralize static friction in the instrument.

Briefly described, this invention comprises a small weight, a substantially undamped spring to which said weight is attached at one end thereof, a point of rigid attachment at the other end of the spring by which the weight and spring may be attached to the instrument and a cage or equivalent thereof against which the weight may strike during its periods of vibration induced by the effect of the airplane's acceleration upon the spring mounting of the weight.

Referring now to the accompanying drawing, Fig. 1 is a side elevation of an airplane instrument which may be an air speed indicator, the device of my invention being mounted at the top thereof and being shown partly in section;

Fig. 2 is a phantom view of an airplane instrument, which may be an altimeter, my device being shown mounted inside the casing of the instrument and being shown partly in section;

Fig. 3 is an end view of my device taken along the line 3—3 of Fig. 1;

Fig. 4 is a side elevation of my device in which a weight of modified form is applied to the drive train of gears of an instrument, which may be of any kind utilizing such a drive train; and Fig. 5 is an end view of a mechanism shown in Fig. 4.

In Fig. 1, 10 is the airplane instrument and 11 is the dash or airplane instrument board, 12 is the casing of the instrument and 13 is the housing of a power drive means which may be a flexible shaft or a pipe for supplying pressure (neither shown), while 14 is the dial and 15 is the bezel. At the top of the instrument there is a lug 16 which may have the shape shown or any other suitable shape whereby it may be attached to the casing 10 and provide a fulcrum for the attachment of a coil spring 17 at some distance away from the casing, say between one-half inch and one and one-half inches. A distance of about three-quarters of an inch is preferred, although the dimensions are not critical. The spring 17 preferably a coil spring but permissibly a flat one, is fastened, firmly with considerable rigidity to the lug 16 either by welding, which is preferred, or by twisting through a hole 18, but otherwise substantially undamped. Its coils are preferably somewhat separated from each other. The purpose of the rigid mounting is to impart maximum vibration to the spring 17 and through it to a weight 19 which in Fig. 1 is shown as a ball. The ball 19 is arranged to be housed within a cage 20 which may have a hollow cylindrical form as shown both in Fig. 1, Fig. 2 and Fig. 3. The point of attachment of the spring 17 to the lug 16 should preferably be slightly higher than the position of the weight 19 when the latter is at rest in the cage 20.

Cage 20 may be attached to the outside casing 12 of the instrument 10 by rivets 21 as shown in Fig. 3. For that purpose the cake 20 may be provided with a foot 22 to conform to the shape or curvature of the instrument casing 12.

In Fig. 2, my device which comprises a lug 16, spring 17, the weight 19 and cage 20, is shown mounted inside the instrument casing 12 so as to be nearer and consequently more able to exert its vibratory action on the operating mechanism of the instrument. In Fig. 2, 23 is an operating platform inside the instrument, this platform being integral with the front wall 24 thereof. A drive shaft 25 is operated through gears 26 and a second shaft 27 from an aneroid device 28. In this arrangement it is important that the aneroid of the device should move without lag and that no static friction should impede the operation of the gears 26 to furnish a correct indication through them and the shaft of 25 to a pointer 29. The cage 20 may be attached in any suitable manner to the front wall 24, but welding is preferred because no opportunity is then offered for the vibrations to be damped.

In operation the lug 16 receives gentle vibration from the accelerative movements of such long period of oscillation that they are ineffective to give the short, sharp taps necessary to break the static friction. The breakaway friction between two sticking parts may be of such magnitude that it is several times that of the sliding friction between the parts after the static fricion has been overcome. The excess effort or energy required to initially overcome the adhesion between the parts has been nicknamed "stiction" by engineers. It may be produced by the gumming of lubricants between the parts, molecular adhesion, corrosion or other causes.

The comparatively low vibration of the lug 16 is transmitted by the spring 17 and by the low inertia of the weight 19 into a comparatively high frequency oscillation which causes the weight 19 to contact forcibly the inner wall of the cage 20, rebound from the latter and again strike the opposite sides of the cage and so continue the oscillation for a varied period of time. The weight 19 is therefore preferably made of hardened steel or other hard material so that it may have maximum elasticity and rebound, likewise the cage is preferably, but not necessarily, made of hard steel. Attachment of the cage 20 to the instrument should be through means having as little shock absorbing quality as possible, preferably welding or rivets 21, as shown in Fig. 3.

Referring now to Figs. 4 and 5, the modification therein shown eliminates the cage 20 and substitutes therefor the drive shaft 30 of a drive train 31 of the instrument. The drive train need not be any particular drive, but is preferably that portion of the main drive which is near the seat of static friction, wherever that occurs most objectionably. For different instruments, this location may, of course, vary. In Figs. 4 and 5 the weight 19 is shaped roughly like a wing nut, with the portion between the wings 31 and 32 cut out to make an opening 33 which is approximately square and substantially larger than the diameter of the shaft 30 about which the weight 19 is to fit. The weight 19 is positioned around the drive shaft 30 so that the latter is well within the opening 33. Vibrations will therefore set up considerable chatter of the weight 19 against the drive shaft 30, thereby decreasing the turning friction between the gears 34 and 35. The exact shape of the opening 33 is immaterial but one with parallel sides is preferred.

It is to be observed that this device is small, inexpensive, simple and may be applied to existing instruments and requires no separate source of power. It is extremely unlikely to get out of order. Its use is not confined to airplane instruments, since it may be used in any location where long period vibrations or accelerations exist which it would be advantageous to convert into short period vibrations for the purpose of overcoming "stiction" or lag.

I claim as my invention:

1. In combination with an indicating instrument, a spring rigidly attached at one end in vibratory contact with said instrument, a weight made of rigid material attached at the free end of said spring, a cage of rigid material substantially surrounding said weight, but leaving it free to oscillate, said cage being mounted in vibration-transmitting contact with said instrument whereby vibration transmitted to said weight will cause the weight to oscillate and to strike said cage repeatedly so that the resulting vibration of the cage will be transmitted to the instrument.

2. In combination with an indicating instrument having a case, a lug mounted in rigid contact with said case, a coil spring rigidly attached at one end to said lug, a weight of rigid material attached at the free end of said spring, a cage substantially surrounding said weight, but leaving it free to oscillate, said cage being mounted in vibration-transmitting contact with the case of said instrument whereby vibration transmitted from said lug through said spring to said weight will cause said weight to oscillate and to strike said cage repeatedly so that the resulting vibration of the cage will be transmited to the instrument.

3. The combination recited in claim 2 in which the weight is spherical.

4. The combination recited in claim 2 in which the weight is made of hardened steel.

5. The combination recited in claim 2 in which the spring is substantially undamped except by the weight and the attachment to the lug and the coils of the spring are spaced apart from each other.

6. In combination with an indicating instrument having a case, and an internal extension thereof, a lug mounted internally of said case in rigid contact with said internal extension, a coil spring rigidly attached at one end to said lug, a weight of rigid material attached to the free end of said spring, a cage in vibration-transmitting contact with said case, said cage substantially surrounding said weight but leaving it free to oscillate so that oscillation of said weight will transmit vibration through said cage to said instrument to prevent the sticking thereof.

7. In combination with an indicating instrument having a power-transmitting train of shafts and gears, a rigidly mounted lug on the exterior of said instrument, a coil spring firmly attached at one end thereof to said lug, a weight of rigid material attached at the other end of said spring, said weight having an opening, said opening being positioned about a power transmitting shaft of said train of shafts and gears whereby said weight is free to oscillate and to strike said shaft with the edges of its opening to set up vibration in said train to reduce static friction thereon.

8. In combination, a lug attached to an object to be vibrated, a coil spring having partially separated coils, said spring being attached by one of its ends to said lug, a weight of rigid material attached to the other end of said spring and an open cage attached elsewhere to said object adapted to house said weight while permitting it to vibrate sufficiently to strike the inner walls of said cage.

9. In combination, a lug on an object to be vibrated, a coil spring having partially separated coils, said spring being attached by one of its ends to said lug, a weight of rigid material attached to said spring at the opposite end from said lug, said weight having substantially the shape of a wing nut and having an opening with substantially parallel sides between the wings, said weight being in loose oscillatable contact with a member on an object to be vibrated, said object making contact with said parallel sides of the weight between the wings thereof.

GEORGE R. LARKIN.

References Cited in the file of this patent

UNITED STATES PATENTS

| Number | Name | Date |
|---|---|---|
| 654,103 | Schrottke | July 17, 1900 |
| 2,001,335 | Urfer | May 14, 1935 |
| 2,163,847 | Perrey | June 27, 1939 |
| 2,195,041 | Von Schlippe | Mar. 26, 1940 |

FOREIGN PATENTS

| Number | Country | Date |
|---|---|---|
| 837,767 | France | Nov. 18, 1938 |